US012619416B2

(12) United States Patent
Sethu et al.

(10) Patent No.: US 12,619,416 B2
(45) Date of Patent: May 5, 2026

(54) CONTINUOUS INTEGRATION AND CONTINUOUS DELIVERY OF ARTIFICIAL INTELLIGENCE MACHINE LEARNING COMPONENTS USING METAMORPHIC RELATIONS

(71) Applicant: GM Global Technology Operations LLC, Detroit, MI (US)

(72) Inventors: Ramesh Sethu, Troy, MI (US); Rami Ismail Debouk, Dearborn, MI (US); Paolo Giusto, Brentwood, CA (US); Azeem Sarwar, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 811 days.

(21) Appl. No.: 18/057,001

(22) Filed: Nov. 18, 2022

(65) Prior Publication Data

US 2024/0168748 A1 May 23, 2024

(51) Int. Cl.

| | |
|---|---|
| *G06F 8/65* | (2018.01) |
| *G06F 8/10* | (2018.01) |
| *G06F 8/33* | (2018.01) |
| *G06F 8/34* | (2018.01) |
| *G06F 8/35* | (2018.01) |
| *G06F 8/60* | (2018.01) |

(Continued)

(52) U.S. Cl.
CPC ................. *G06F 8/65* (2013.01); *G06F 8/10* (2013.01); *G06F 8/33* (2013.01); *G06F 8/355* (2013.01); *G06F 8/70* (2013.01); *G06F 11/3684* (2013.01); *G06V 10/774* (2022.01); *G06F 8/34* (2013.01); *G06F 8/60* (2013.01);

*G06F 8/71* (2013.01); *G06F 11/3672* (2013.01); *G06F 11/368* (2013.01); *G06N 3/08* (2013.01); *G06N 20/00* (2019.01); *H04W 4/44* (2018.02)

(58) Field of Classification Search
CPC .. G06F 17/5095; G06F 17/70; G06F 11/3684; G06F 8/60; G06F 11/3672; G06F 8/71; G06F 8/34; G06F 11/368; G06N 20/00; G06N 3/08; H04W 4/44
See application file for complete search history.

(56) References Cited

PUBLICATIONS

Altamimi et al., NPL ("Metamorphic relation automation: Rationale, challenges, and solution directions" Published Jan. 14, 2022 by Wiley Software Evolution and Process Total 15 pages (Year: 2022).*

* cited by examiner

*Primary Examiner* — Quoc A Tran
(74) *Attorney, Agent, or Firm* — Vivacqua Crane, PLLC

(57) ABSTRACT

A system for CI/CD of AI/ML based components includes a cloud infrastructure which receives multiple new requirements from a vehicle designer or a developer, with the new requirements adapted for artificial intelligence/machine learning (AI/ML) based components of a vehicle. A dataset is provided. A metamorphic relations (MR) module receives input information from the dataset and sends MR information to the dataset. A components requirements database includes the new requirements in addition to existing requirements for the AI/ML based components. The MR module also receives components requirements data from the components requirements database and sends the MR information to the components requirements database. An AI/ML algorithm analyzes the input information from the dataset and prepares an updated component dataset.

17 Claims, 7 Drawing Sheets

(51) Int. Cl.
| | |
|---|---|
| *G06F 8/70* | (2018.01) |
| *G06F 8/71* | (2018.01) |
| *G06F 11/3668* | (2025.01) |
| *G06N 3/08* | (2023.01) |
| *G06N 20/00* | (2019.01) |
| *G06V 10/774* | (2022.01) |
| *H04W 4/44* | (2018.01) |

CONTINUOUS INTEGRATION AND CONTINUOUS DELIVERY OF ARTIFICIAL INTELLIGENCE MACHINE LEARNING COMPONENTS USING METAMORPHIC RELATIONS

INTRODUCTION

The present disclosure relates to artificial intelligence/machine learning based components used in autonomous vehicles.

Artificial intelligence/machine learning (AI/ML) based components perform many functionalities in autonomous vehicles (AVs) and advanced driver assistance systems (ADAS) and their verification and validation is important for the correctness of these functionalities. The specification of the behavior of AI/ML based components describe complex human based concepts such as lanes, pedestrians, traffic signals and the like. AI/ML based components are typically developed starting from a collected sample dataset of examples which ultimately defines the final component behaviors.

AI/ML based components are eventually implemented as software (SW) components mapped to hardware (HW) resources and are used across multiple different inputs, environments, and platforms. Metamorphic relations (MRs) capture relationships including differences between the components. Many examples of MRs exist: a simplest one defining a variation due to inputs such as a small change in input having a small change in the outputs, for example, $|F(x+d)-F(d)|<e$.

While current AI/ML based components and product development processes achieve their intended functionalities, there is a need for a new and improved system and method for development of AI/ML based components.

SUMMARY

According to several aspects, a system for continuous integration/continuous deployment (CI/CD) of artificial intelligence/machine learning (AI/ML) based components incorporated in a computational cloud infrastructure includes a requirements database system receiving new requirements from a vehicle designer or developer, with the new requirements adapted for AI/ML based components of a vehicle, the system including a dataset and a metamorphic relations (MR) module receiving input information from the dataset and sending MR information to the dataset. The components requirements database includes the new requirements in addition to existing requirements for the AI/ML based components. The MR module also receives components requirements in the form of metamorphic relations from the components requirements database and, in turn, sends new MR information to the components requirements database. A machine learning based system analyzes the input information from the dataset and prepares an updated component dataset.

In another aspect of the present disclosure, multiple test cases data is also received from and sent to the MR module.

In another aspect of the present disclosure, a vehicle requirements database includes multiple edge cases from multiple vehicles, the edge cases defining challenging scenarios in which performance of AI/ML components are often poor.

In another aspect of the present disclosure, the computational cloud infrastructure supports continuous integration/continuous deployment (CI/CD) of the AI/ML components.

In another aspect of the present disclosure, a requirements capturing module (RCM) receives the new requirements as input from the vehicle designer or the developer.

In another aspect of the present disclosure, an asset refinement engine (ARE) receiving refined requirements from the RCM.

In another aspect of the present disclosure, an edge case capturing component (ECC) receives requirements data from the vehicle requirements database and generates inputs to the AI/ML based components for situations when the AI/ML components may perform poorly due to images in low light conditions, images with overlapping traffic participants, or images with long shadows or degraded lane markers, with the inputs to the ECC from the vehicle requirements database being generated directly from real-life scenarios.

In another aspect of the present disclosure, an AI/ML development platform (ADP) receives an output of the ARE and from the dataset, the ADP being used for all AI/ML based components; and wherein an output from the ADP is forwarded to the AI/ML algorithms.

In another aspect of the present disclosure, the ARE employs processes and methods for validation, generation, and refinement of requirements, datasets and test cases, provides a process and method for simultaneous refinement of requirements, datasets and test cases, provides representation of requirements as metamorphic relations (MRs), and extraction of MRs from the requirements, datasets and test cases, and converts MRs as satisfiability modulo theory (SMT) formulae; wherein an output of the ARE is forwarded to the dataset.

In another aspect of the present disclosure, the updated component requirements are forwarded as an over-the-air (OTA) update to the vehicle requirements database.

According to several aspects, a method for continuous integration/continuous deployment (CI/CD) of artificial intelligence/machine learning (AI/ML) based components using a cloud-based architecture comprises: performing CI/CD of AI/ML based components; entering input data from a vehicle requirements database into an edge case capturing component (ECC) and applying the ECC to generate inputs to the AI/ML based components; inputting design data as design requirements from a vehicle designer or a developer into a requirement capturing module (RCM); providing the design requirements from the RCM to an asset refinement engine (ARE) to validate, generate, and refine the design requirements; and analyzing data retrieved from a dataset and preparing an updated component dataset using an AI/ML algorithm.

In another aspect of the present disclosure, the method further includes providing representation of the design requirements as metamorphic relations (MRs) using the ARE.

In another aspect of the present disclosure, the method further includes extracting the MRs from the design requirements using the ARE.

In another aspect of the present disclosure, the method further includes converting the MRs as satisfiability modulo theory (SMT) formulae using the ARE.

In another aspect of the present disclosure, the method further includes operating a metamorphic relations module receiving data from and sending data to the components requirements database to check consistency of behaviors across variations and to generate new test cases.

In another aspect of the present disclosure, the method further includes sending an output of the ARE and data from the dataset to an AI/ML development platform (ADP).

In another aspect of the present disclosure, the method further includes operating the ECC to perform a pre-analysis and filter the inputs to the AI/ML based components.

According to several aspects, a method to continuously integrate/continuously deploy (CI/CD) artificial intelligence/machine learning (AI/ML) based components, comprises: performing CI/CD of AI/ML based components; entering input data from a vehicle requirements database into an edge case capturing component (ECC) and applying the ECC to generate inputs to the AI/ML based components; inputting design data as design requirements from a vehicle designer or a developer into a requirements capturing module (RCM); providing the design requirements from the RCM to an asset refinement engine (ARE) to validate and generate the design requirements; refining the design requirements applying a satisfiability modulo theory (SMT) formulae solver; and extracting and analyzing data retrieved from a dataset and sending the data to a dataset generator to generate a new dataset.

In another aspect of the present disclosure, the method further includes: extracting behaviors from real life driving situations; retrieving images from observers of a vehicle; and pre-analyzing and filtering edge cases using the ECC.

In another aspect of the present disclosure, the method further includes: extracting MR relations from the data retrieved from the dataset; converting the MR relations to SMT formulae; and preparing an updated component dataset using AI/ML algorithms.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
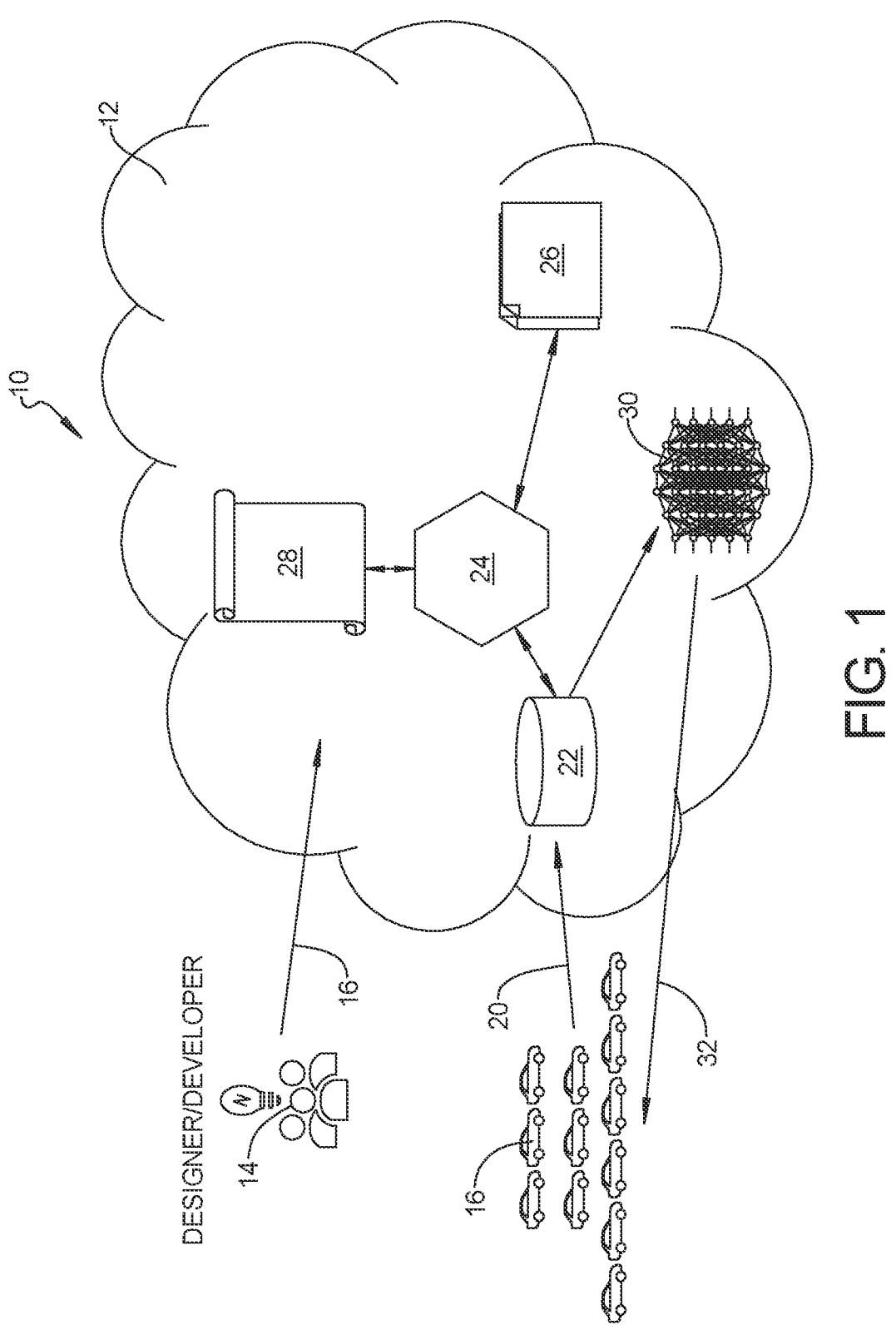
FIG. 1 is a flow diagram of a system and method for continuous integration/continuous deployment (CI/CD) of artificial intelligence/machine learning (AI/ML) based components using metamorphic relations according to an exemplary aspect.

Referring to FIG. 1, a system and method for continuous integration/continuous deployment (CI/CD) of artificial intelligence/machine learning (AI/ML) based components using metamorphic relations 10 includes a cloud infrastructure 12 which receives design data 14 from a vehicle designer or developer providing new requirements 16 for artificial intelligence/machine learning (AI/ML) based components and a vehicle requirements database 18 including edge cases 20 from multiple vehicles. The cloud infrastructure 12 includes a dataset 22 which receives data from and sends data to a metamorphic relations module 24. Data defining multiple test cases 26 is also received from and sent to the metamorphic relations module 24. Examples of the test cases 26 may include: Example 1) an AI model including a perception system detecting and recognizing a traffic sign, having an input of an RBG image containing a traffic sign board at a top right hand corner and output using an on-board camera; and an output including a traffic signal class such as a STOP sign; Example 2) a pedestrian detection model having an input of an RGB image of a road in front with multiple lanes containing a pedestrian on a left hand side of the vehicle lane, and an output of a pedestrian present; and Example 3) a lane detection model having an input of an image of a road containing multiple lane, and an output of an image with pixels annotated with lane marker positions.

The new requirements 16 in addition to existing requirements for AI/ML based components are saved in a components requirements database 28, which receives data from and sends data to a metamorphic relations module 24. Data in the dataset 22 is implemented using AI/ML algorithms 30 which analyzes the data of the dataset 22 and prepares updated component data which may be forwarded as an over-the-air (OTA) update 32 to the vehicle requirements database 18.

With respect to the metamorphic relations module 24, (metamorphic relations) MRs capture relationships between these variations. Examples of MRs defining a variation due to inputs such as a small change in input having a small change in the outputs such as $|F(x+d)-F(d)|<e$ may be applied to conclude that moving a traffic signal from a top left corner to a top right corner should not cause any substantial change in the output of a traffic signal recognition system. MR relations identified by the metamorphic relations module 24 may also be useful to check for consistency of behaviors across variations and to generate test cases, including the test cases 26.

Referring to FIG. 2 and again to FIG. 1, the system and method for continuous integration/continuous deployment of artificial intelligence/machine learning based components using metamorphic relations 10 includes an architecture 34 of the cloud infrastructure 12 that supports continuous integration/continuous deployment (CI/CD) of AI/ML components and includes four main components. The design data 14 from the vehicle designer or developer described in reference to FIG. 1 provides input to a first main component defining a (requirement capturing module) RCM 36. The RCM 36 may incorporate any standard general purpose requirement management tool including (doors next generation) DNG, Jama or the like.

The RCM 36 forwards design requirements to a second main component of the cloud-based architecture system 34 defining an (asset refinement engine) ARE 38. The ARE 38 employs processes and methods for validation, generation, and refinement of requirements, datasets and test cases. The ARE 38 also provides a process and method for simultaneous refinement of requirements, datasets and test cases. The ARE 38 further provides representation of requirements as MRs, and extraction of MRs from the requirements, datasets and test cases. In addition, the ARE 38 converts MRs as (satisfiability modulo theory) SMT formulae. An output of the ARE 38 is provided to a dataset 40.

The vehicle requirements database 18 provides input data to a third main component of the cloud-based architecture system 34 defining an edge case capturing component (ECC) 42. The ECC 42 more specifically generates inputs to the AI/ML component development for situations when the AI/ML components may perform poorly with respect to reliability, safety, confidence in prediction or accuracy. For example, poor component performance may be due to images in low light conditions, images with overlapping traffic participants, images with long shadows or degraded lane markers. The inputs to the ECC 42 from the vehicle requirements database 18 are generated either directly from real-life scenarios or are generated from real-life images. Behaviors are extracted in the ECC 42 from real-life driving situations that involve edge case scenarios. Vehicle software 44 provides sensors and observers that extract such images or scenarios which are triggered by predetermined conditions and sends the images or scenarios to the ECC 42. The ECC 42 also performs a pre-analysis and conducts filtering to extract or generate inputs and forwards results to the dataset 40.

An output of the ARE 38 and data from the dataset 40 are forwarded to a fourth main component of the cloud-based architecture system 34 defining an AI/ML development platform (ADP) 46, for example tensor flow (TF) and Keras. The ADP 46 is used for all AI/ML components and may include for example TF. An output from the ADP 46 is forwarded to the AI/ML algorithms 30.

Figure 2:
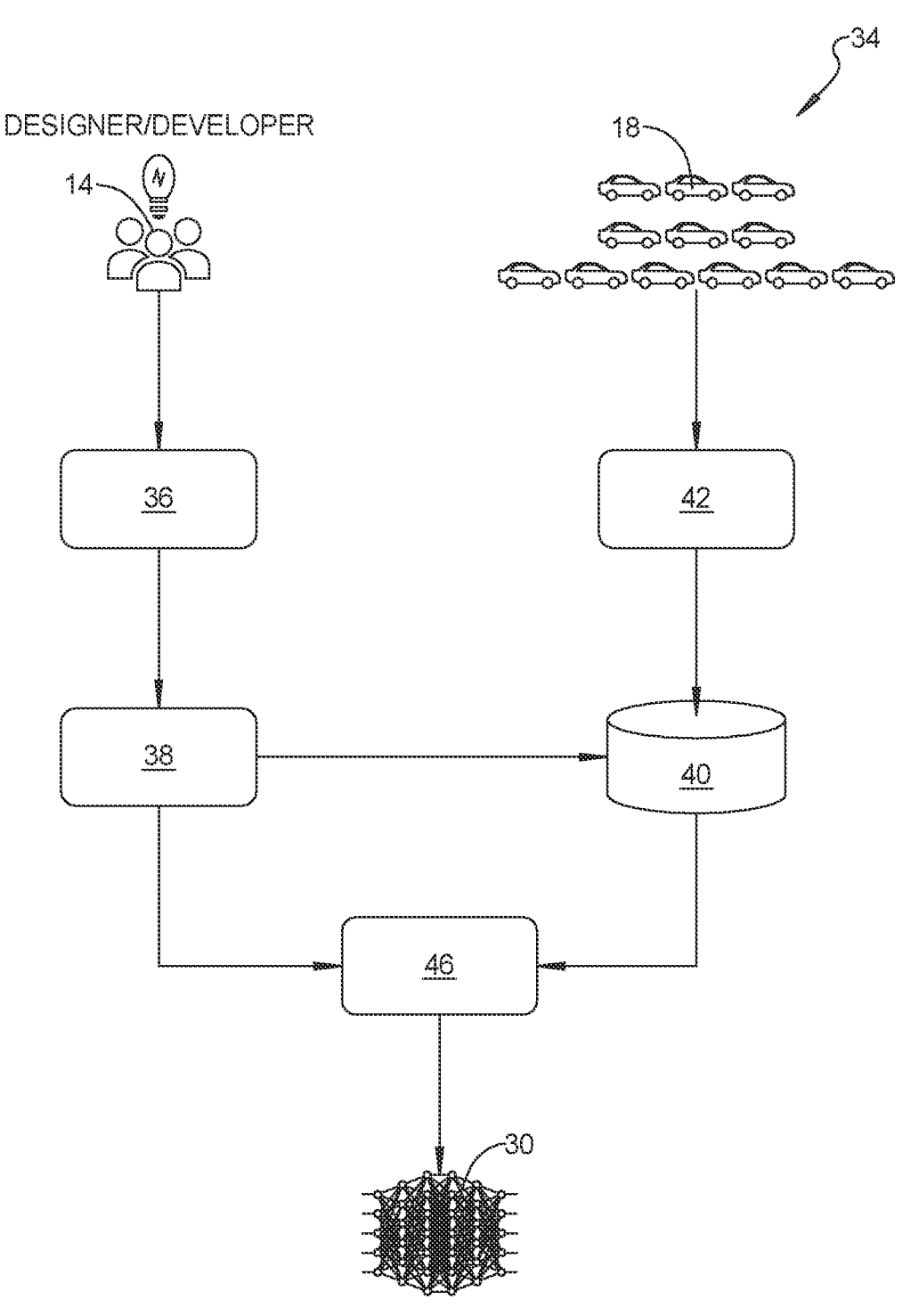
FIG. 2 is a flow diagram of a cloud-based architecture system supporting CI/CD of AI/ML components of FIG. 1.

Referring to FIG. 3 and again to FIGS. 1 and 2, a flow diagram 48 identifies the ECC 42 includes a pre-processor 50 which performs a pre-analysis of the data forwarded from the vehicle requirements database 18. An extraction and synthesis module 52 receives an output from the pre-processor 50 and conducts filtering to extract or generate challenging inputs 54 and forwards results including the challenging inputs 54 to the dataset 40.

Figure 3:
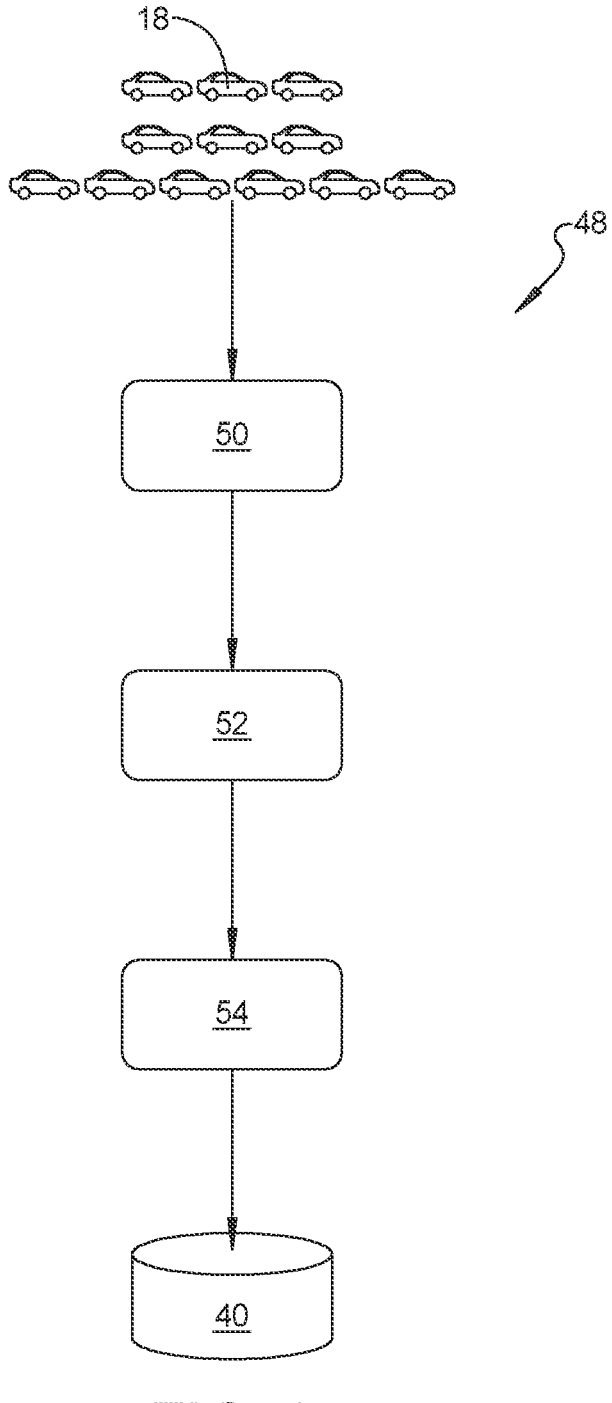
FIG. 3 is a flow diagram identifying an edge case capturing component (ECC) which includes a pre-processor which performs a pre-analysis.

Referring to FIG. 4 and again to FIGS. 1 through 3, a flow diagram 56 identifies how requirement refinement is conducted for the system and method for continuous integration/continuous deployment of artificial intelligence/machine learning based components using metamorphic relations 10 and includes the set of vehicle requirements in the components requirements database 28 which are input into a first SMT converter 58 which converts the set of vehicle requirements in the components requirements database 28 into first SMT formulae 60. The first SMT formulae 60 are fed to a first SMT solver 62. In parallel, data from the dataset 40 and data from the multiple test cases 26 are input into a first extraction module 64 which extracts first MR relations data 66 and outputs the first MR relations data 66 to a second SMT converter 68 which converts the first MR relations data 66 into second SMT formulae 70. The second SMT formulae 70 are also fed to the first SMT solver 62. The first SMT formulae 60 and the second SMT formulae 70 are together solved in the first SMT solver 62 to produce a set of modified requirements 72.

For the above features, the SMT formulae are properties expressed in a fragment of mathematical logic for which efficient solvers exist. The SMT formulae are used for representing requirements and MRs. The SMT solver such as the first SMT solver 62 is used for consistency in verifying formulae. MR relations are specific types of properties that hold for a dataset or test cases.

Figure 4:
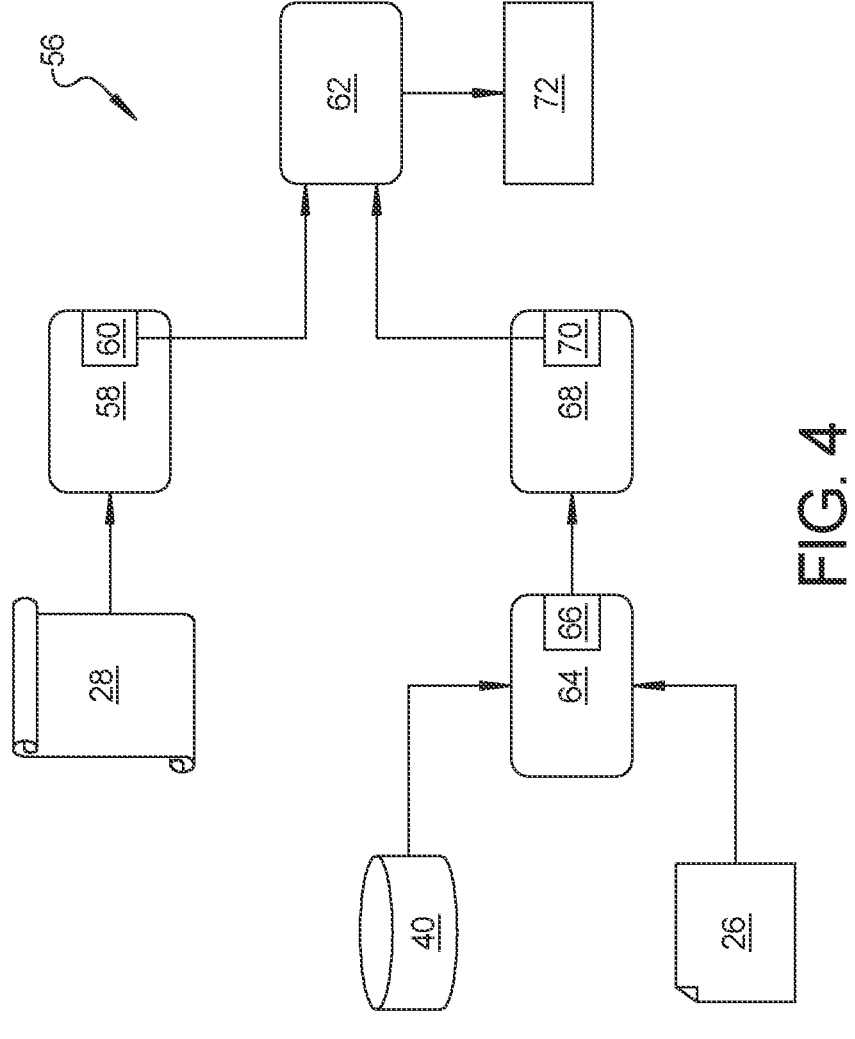
FIG. 4 is a flow diagram identifying how the requirement refinement is conducted for the system of FIG. 1.
Figure 5:
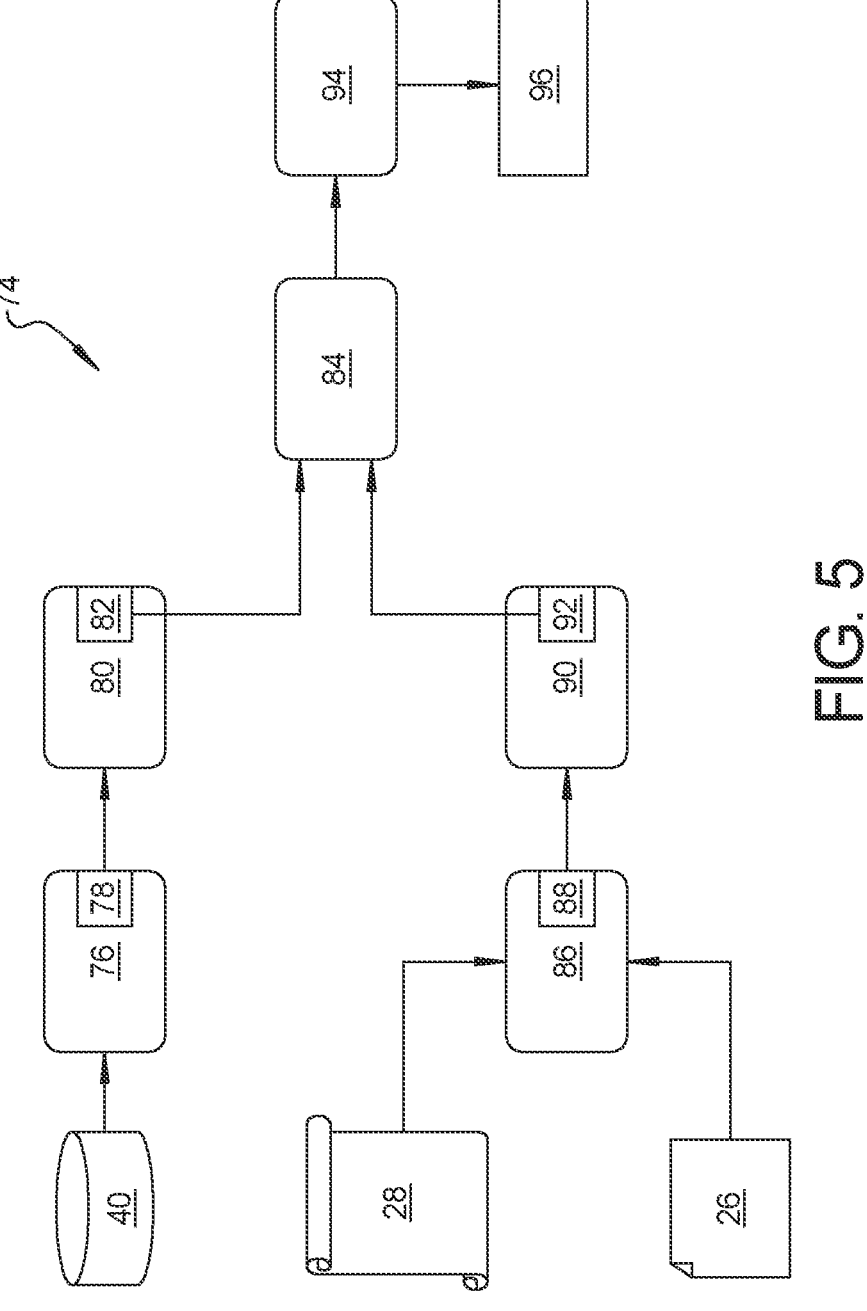
FIG. 5 is a flow diagram identifying how the dataset refinement is conducted for the system of FIG. 1.

Referring to FIG. 5 and again to FIG. 4, a flow diagram 74 identifies how dataset refinement is conducted for the system and method for continuous integration/continuous deployment of artificial intelligence/learning based components using metamorphic relations 10 and provides data from the dataset 40 which is input into a second extraction module 76 which extracts second MR relations data 78. The second MR relations data 78 is input into a third SMT converter 80 to convert the second MR relations data 78 into a third SMT formulae 82. The third SMT formulae 82 are fed to a second SMT solver 84. In parallel, the data of the components requirements database 28 and the data from the multiple test cases 26 are input into a third extraction module 86 which extracts third MR relations data 88. The third MR relations data 88 is fed into a fourth SMT converter 90 to convert the third MR relations data 88 into a fourth SMT formulae 92. The third SMT formulae 82 and the fourth SMT formulae 92 are together forwarded to a second SMT solver 84 wherein the third SMT formulae 82 and the fourth SMT formulae 92 are solved and forwarded to a dataset generator 94. The dataset generator 94 generates a new dataset 96, whose data may be added to the dataset 40.

Figure 6:
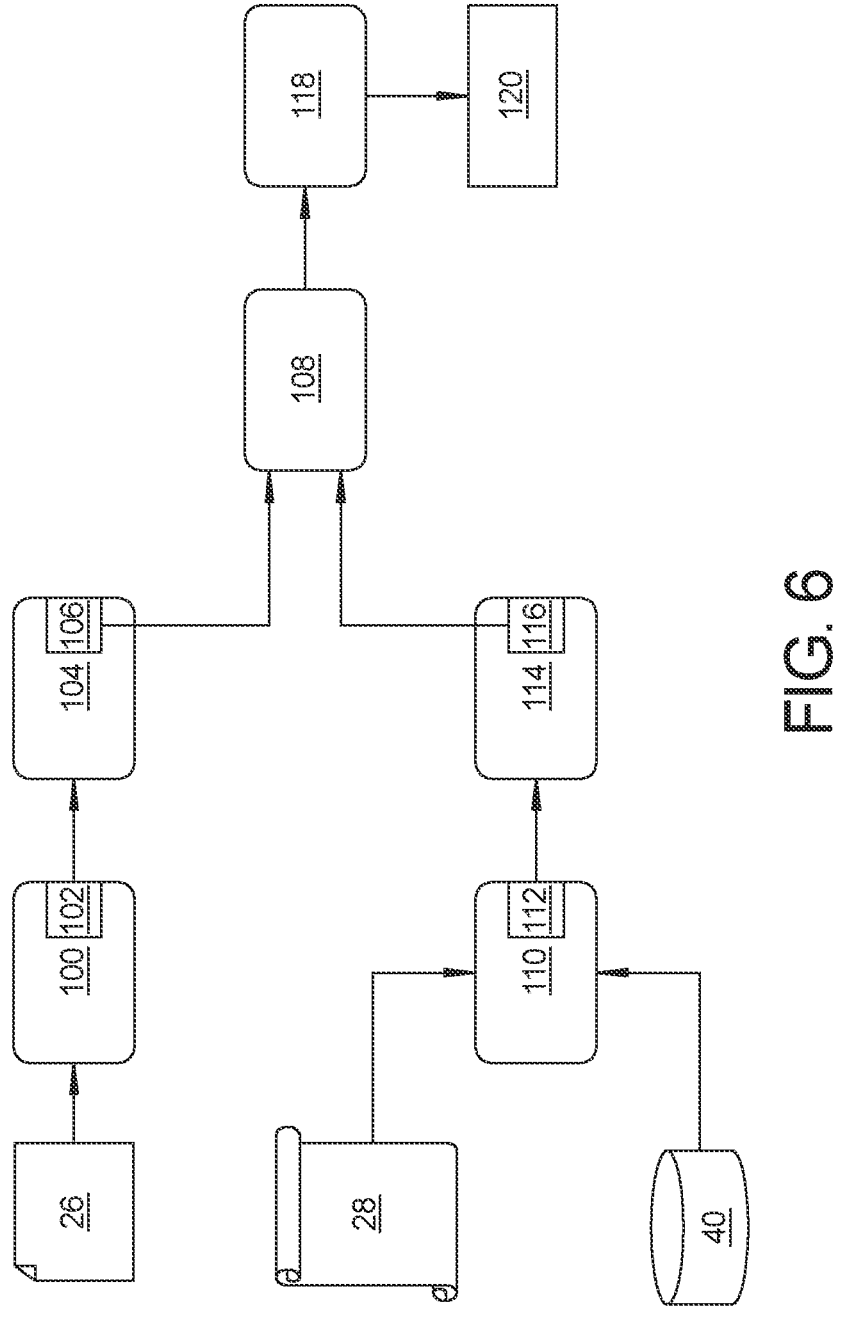
FIG. 6 is a flow diagram identifying how the test case generation is conducted for the system of FIG. 1.

Referring to FIG. 6, a flow diagram 98 identifies how test case generation is conducted for the system and method for continuous integration/continuous deployment of artificial intelligence/machine learning based components using metamorphic relations 10 and includes the test cases 26 which is input into a fourth extraction module 100 which extracts fourth MR relations data 102. The fourth MR relations data 102 is input into a fifth SMT converter 104 to convert the fourth MR relations data 102 into a fifth SMT formulae 106. The fifth SMT formulae 106 are fed to a third SMT solver 108. In parallel, the data of the components requirements database 28 and the data from the dataset 40 are input into a fifth extraction module 110 which extracts sixth MR relations data 112. The sixth MR relations data 112 is fed into a sixth SMT converter 114 to convert the sixth MR relations data 112 into a sixth SMT formulae 116. The sixth SMT formulae 116 is fed to the third SMT solver 108. In the third SMT solver 108 the fifth SMT formulae 106 and the sixth SMT formulae 116 are solved and forwarded to a test case generator 118. The test case generator 118 generates a new set of test cases 120, whose data may be added to the test cases 26.

Figure 7:
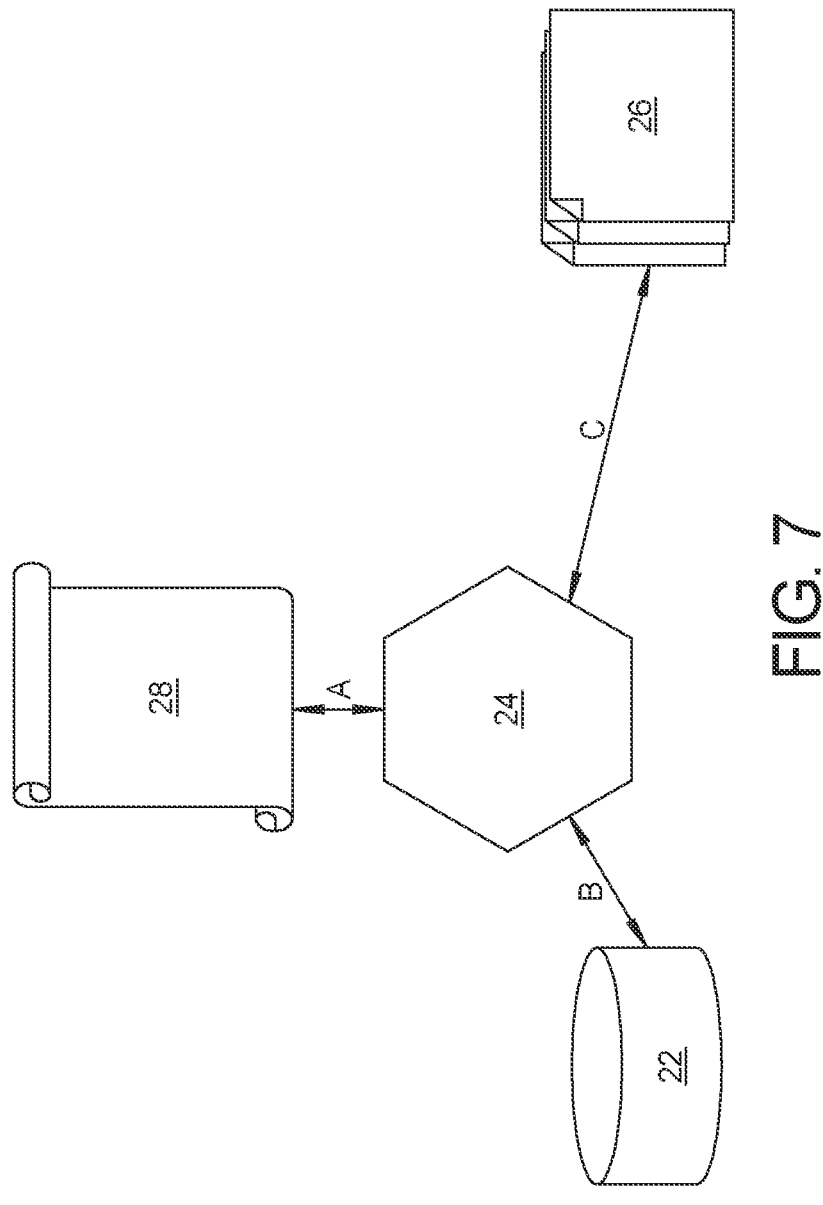
FIG. 7 is a flow diagram identifying steps performed to achieve iterative simultaneous refinement of the data developed by the system of FIG.

Referring to FIG. 7 and again to FIGS. 1 through 6, a flow diagram 122 identifies steps that may be performed to achieve iterative simultaneous refinement of the data developed by the system and method for continuous integration/continuous deployment of artificial intelligence/machine learning based components using metamorphic relations 10. A designer/developer may start at any of the following three items defining the dataset 22, the metamorphic relations module 24 and the test cases 26 with an independent set of assets. The three methods indicated as a Method A, B and C are repeated successively to enlarge every asset. The iteration process terminates when all assets have an acceptable quality which is either determined or predefined by the designer/developer.

A system and method for continuous integration/continuous deployment of artificial intelligence/machine learning based components using metamorphic relations 10 of the present disclosure defines architecture and components supporting CI/CD of AI/ML components. Cloud and edge-based embodiments are provided. Processes and methods are defined for validation, generation, and refinement of requirements, datasets and test cases. The system and method for continuous integration/continuous deployment of artificial intelligence/machine learning based components using metamorphic relations 10 of the present disclosure also enables simultaneous refinement of the requirements, the datasets and the test cases.

Representation of requirements may be provided as metamorphic relations. Extraction of metamorphic relations from requirements, datasets and test cases is also provided. A process and method of conversion of metamorphic relations as SMT formulae is also provided.

A system and method for continuous integration/continuous deployment of artificial intelligence/machine learning based components using metamorphic relations 10 of the present disclosure provides at least three assets for AI/ML component development and verification which include: requirements, datasets and test cases. The system of the present disclosure provides for continuous improvement and continuous deployment (CI/CD) of AI/ML components, and management and maintenance of these assets as the components evolve over time from conception to post-deployment. The system and method of the present disclosure also uses a cloud-based architecture and methods/tools to support continual improvement and deployment of AI/ML. The cloud-based architecture supports capture of new edge cases observed in the field and provides for changing requirements, as well as a development platform that enables development and refinement of AI/ML components for changing requirements and new edge cases.

A systematic approach is used to develop and refine all three assets hand-in-hand and leverages metamorphic relations. Three distinct work flows are defined that extract these relations and use them to enable checking the validity, refinement and enhancement of the other assets. Portions of the system work flows are also automatable.

A system and method for continuous integration/continuous deployment of artificial intelligence/machine learning based components using metamorphic relations 10 of the present disclosure offers several advantages. These include provision of a cloud-based architecture for continuous improvement of AI/ML component development and mining or learning of a metamorphic relation from a dataset. A systematic verification flow is provided from requirements/ dataset to test cases. The present system and method incorporate application of metamorphic relations for the development and refinement of AI/ML component requirements and datasets. A process flow and method for generation of rich test cases allows for verifying AI/ML components developed using the present system and method, as well as continuous integration/continuous deployment (CI/CD) of AI/ML components, datasets and requirements.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for (continuous integration continuous deployment) CI/CD of (artificial intelligence/machine learning) AI/ML based components, comprising:
   a cloud infrastructure which receives multiple new requirements from a vehicle designer or a developer, with the new requirements adapted for artificial intelligence/machine learning (AI/ML) based components of a vehicle;
   a dataset;
   a metamorphic relations (MR) module which receives input information from the dataset and sends MR information to the dataset;

a components requirements database which includes the new requirements in addition to existing requirements for the AI/ML based components;
   the MR module also receiving components requirements data from the components requirements database and sending the MR information to the components requirements database, wherein the MR information defines a variation due to inputs such as a small change in input having a small change in output; and
   an AI/ML algorithm which analyzes the input information from the dataset and prepares an updated component dataset,
   wherein the updated component dataset is transmitted as an over-the-air (OTA) update to a vehicle requirements database for deployment to AI/ML based components of a vehicle.

2. The system for CI/CD of AI/ML based components of claim 1, further including multiple test cases data also received from and sent to the MR module.

3. The system for CI/CD of AI/ML based components of claim 2, including a vehicle requirements database having multiple edge cases from multiple vehicles.

4. The system for CI/CD of AI/ML based components of claim 1, including a cloud-based architecture supporting CI/CD of the AI/ML based components.

5. The system for CI/CD of AI/ML based components of claim 4, including a requirement capturing module (RCM) receiving the new requirements as input from the vehicle designer or the developer.

6. The system for CI/CD of AI/ML based components of claim 5, including an asset refinement engine (ARE) which receives refined requirements from the RCM.

7. The system for CI/CD of AI/ML based components of claim 6, including an edge case capturing component (ECC) which receives requirements data from a vehicle requirements database and generates inputs to the AI/ML based components for situations when the AI/ML based components may perform poorly due to images in low light conditions, images with overlapping traffic participants, or images with long shadows or degraded lane markers, with the inputs to the ECC from the vehicle requirements database being generated directly from real-life scenarios.

8. The system for CI/CD of AI/ML based components of claim 7, including an AI/ML development platform (ADP) receiving an output of the ARE and from the dataset, the ADP being used for all AI/ML based components; and wherein an output from the ADP is forwarded to the AI/ML algorithms.

9. The system for CI/CD of AI/ML based components of claim 6, wherein the ARE: employs processes and methods for validation, generation, and refinement of requirements, datasets and test cases; provides a process and method for simultaneous refinement of requirements, datasets and test cases; provides representation of requirements as metamorphic relations (MRs), and extraction of MRs from the requirements, datasets and test cases; and converts MRs as satisfiability modulo theory (SMT) formulae; and wherein an output of the ARE is forwarded to the dataset.

10. The system for CI/CD of AI/ML based components of claim 1, including a vehicle requirements database, wherein the updated component dataset is forwarded as an over-the-air (OTA) update to the vehicle requirements database.

11. A method for continuous integration continuous deployment (CI/CD) of artificial intelligence/machine learning (AI/ML) based components using a cloud-based architecture, comprising:
   performing CI/CD of AI/ML component development;

entering input data from a vehicle requirements database into an edge case capturing component (ECC) and applying the ECC to generate inputs to the AI/ML component development;

inputting design data as design requirements from a vehicle designer or developer into a requirements capturing module (RCM);

providing the design requirements from the RCM to an asset refinement engine (ARE) to validate, generate, and refine the design requirements;

analyzing data retrieved from a dataset and preparing an updated component dataset using an AI/ML algorithm;

transmitting the updated component dataset as an over-the-air (OTA) update to a vehicle requirements database in a vehicle; and deploying the updated component dataset to AI/ML based components of the vehicle.

12. The method of claim 11, further including providing representation of the design requirements as metamorphic relations (MRs) using the ARE.

13. The method of claim 12, further including extracting the MRs from the design requirements using the ARE.

14. The method of claim 13, further including converting the MRs as satisfiability modulo theory (SMT) formulae using the ARE.

15. The method of claim 11, further including operating a metamorphic relations module receiving data from and sending data to a components requirements database to check consistency of behaviors across variations and to generate new test cases.

16. The method of claim 11, further including sending an output of the ARE and data from the dataset to an AI/ML development platform (ADP).

17. The method of claim 11, further including operating the ECC to perform a pre-analysis and filter the inputs to the AI/ML based components.

* * * * *